UNITED STATES PATENT OFFICE.

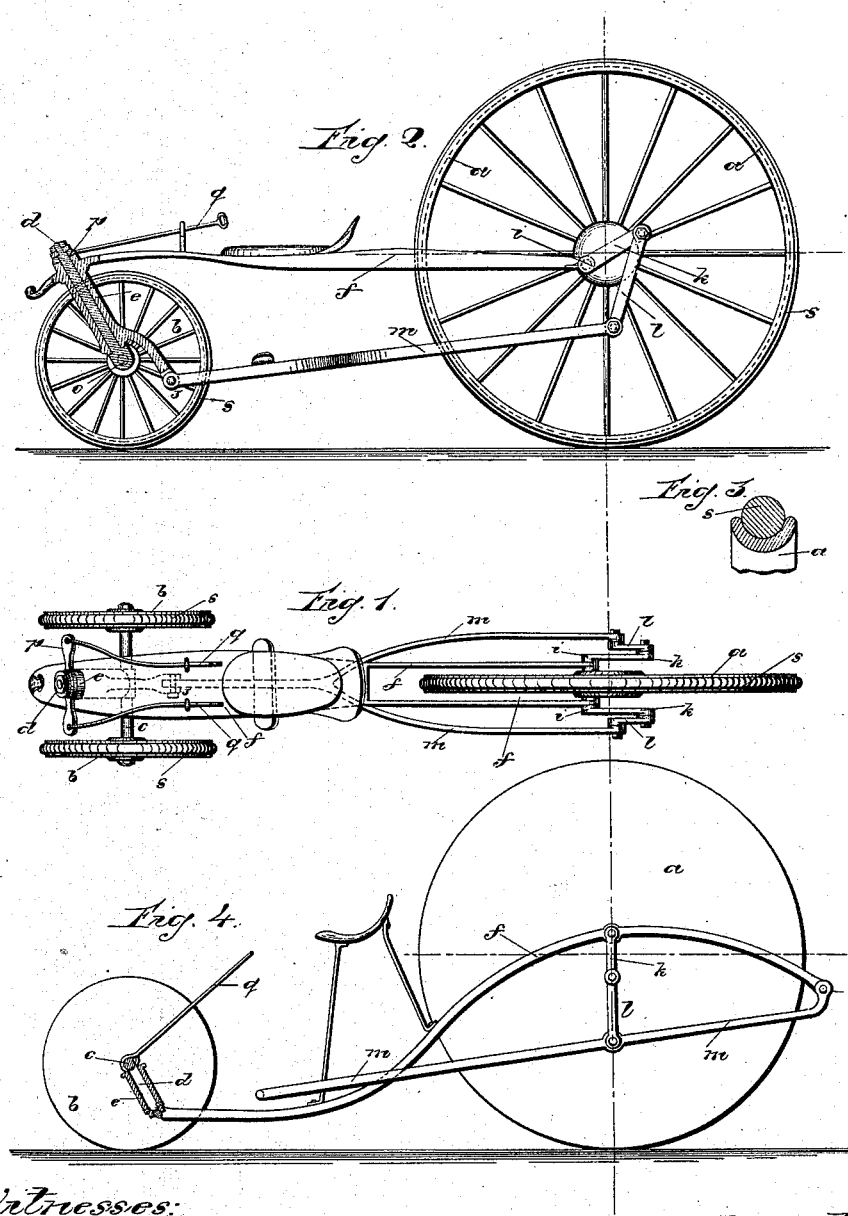

LEMUEL W. SERRELL, OF BROOKLYN, NEW YORK, ASSIGNOR TO ROBERT FOULDS, OF PASSAIC, NEW JERSEY.

IMPROVED VELOCIPEDE.

Specification forming part of Letters Patent No. 87,713, dated March 9, 1869.

*To all whom it may concern:*

Be it known that I, LEMUEL W. SERRELL, of Brooklyn, in the county of Kings, and State of New York, have invented and made a new and useful Improvement in Vehicles; and I do hereby declare the following to be a full, clear, and exact description of the said invention, reference being had to the annexed drawing, making part of this specification, wherein—

Figure 1 is a plan of said vehicle.

Figure 2 is a side view of the same, with the king-bolt sockets in section.

Figure 3 is a section of the rim of the driving-wheel.

Figure 4 is an outline side elevation, illustrating a modification in the frame-work of said vehicle.

Similar marks of reference denote the same parts.

Vehicles have heretofore been made with two, three, and four wheels, and cranks have been applied to one of the wheels in the velocipede patented in France, February 24, 1829, No. 2,567.

Other velocipedes have been made with two rear wheels, and one front wheel, driven by a crank, as in the English patent, No. 1,179, A. D. 1854.

Other propelling-horses or vehicles have been made with two rear wheels, and one front steering-wheel, the power being applied to the cranks of the pair of wheels, as in English provisional protection, No. 1,595, A. D. 1861; or the pair of wheels, with its crank-shaft, has been in front, and the steering-wheel behind, as in the English patent, No. 2,402, A. D. 1862.

In all vehicles, the momentum in turning a curve tends to throw the vehicle toward the outer side of the curve. This is compensated, in railroads, by raising the outer rail, and, in two-wheeled velocipedes, by the rider inclining his vehicle, so that the central plane of the same leans inward, or toward the center of the circle described.

Where a vehicle is supported by three or four wheels, the vertical central plan, longitudinally of the vehicle, has been maintained at right angles, or nearly so, to the surface traveled over. Hence, in turning short curves under a rapid movement, such vehicle, if high, in proportion to the breadth of base between the wheels, is liable to, and in the case of velocipedes often does, fall over toward the outside of the curve that is being run.

My invention overcomes these difficulties, and consists in a vehicle having three wheels, the pair of them that is on one axle being so fitted that, first, the act of turning them, to steer the vehicle around a curve, shall produce an inclination of the longitudinal central plane of the vehicle, to compensate the inertia; second, the inclination of the vertical central plane of the vehicle shall effect the turning of the pair of wheels toward the same side, and thereby compensate any tendency for the vehicle to upset, by the wheels themselves running the vehicle bodily toward the direction in which it might tend to upset, and thus causing the vehicle to be self acting in righting itself.

In the drawing—

A is the single wheel.

*b b* are wheels on the axle *c*, to which axle a ⊥-piece is affixed, forming the king-bolt *d*.

This king-bolt is within a tube, *e*, or other bearings, on the frame or perch *f*, connecting, in any desired manner, to the axle of the wheel *a*.

The bearing *e* does not stand vertical, as heretofore, but inclines forward at about thirty degrees, more or less, from the perpendicular line. This amount of inclination will depend upon the forces acting by inertia to overturn the vehicle in running around curves.

It will be understood that, if the inclination of said king-bolt is thirty degrees, and the vehicle is standing on a level surface, the inclining of the vehicle itself, so that the central plane of the same shall be thirty degrees out of perpendicular, will cause the wheels *b b* to roll, so that the axle *c* is in a diagonal position, and the vehicle hence would run around in a curve, the same moving in the direction toward which the vehicle is inclined, thus counteracting the action of the inertia. If the angle of inclination of *d* from the perpendicular is less, the wheels *b* and axle *c* will be turned into a more diagonal position, with a corresponding inclination of the vehicle, and the reverse.

The frame or perch $f$ may be connected to the inclined bearing $e$, at the lower part of the same, as illustrated in fig. 4, or it may be connected at the upper end, as shown in fig. 2.

Where this improvement is used with a velocipede, propelled in any manner, the same is not liable to be upset, because, if the front wheels are steered by hand, the act of so doing inclines the body of the vehicle; and, if the rider (purposely, for steering, or by accident) gives the vehicle an inclination sidewise, that act causes the front wheels to be turned to the position for running the curve that would prevent upsetting, thus adapting the velocipede to inexperienced persons, to ladies, and to use on uneven surfaces, that might cause the two or three-wheeled velocipedes to upset.

I have represented the perch $f$ as connected to the axle $i$, which is eccentric to the wheel $a$; and the cranks $k\ k$, pitmen $l\ l$, and bifurcated foot-treadle $m$, give motion from the feet, said treadle $m$ being hinged at 3, and the cranks $k$ being at one hundred and eighty degrees from the eccentric-axle $i$, or nearly so. Thus the perch $f$ will be raised and lowered as the wheel $a$ is revolved, and the rider, by pressing on the treadles, and rising from his seat on the perch $f$, as that perch rises, and then bearing his weight on the same, and relieving the treadles as the perch descends, will give a rapid and powerful rotary movement to the wheel $a$, to propel the velocipede.

If desired, the axle $i$ may be central in the wheel $a$, and the treadles $m$ be separated, and the cranks $k$ placed at about one hundred and eighty degrees to each other, so that the seat will not be moved up and down, and the feet and treadles be operated alternately; or the person might sit the other way, and act, with his feet, on the cranks $k$, so that the wheels $b\ b$ shall be in the rear; but I do not recommend the same.

When the frame $f$ is depressed, as in fig. 4, (as specially adapted to ladies,) the treadles $m$ may be levers of the first order, so that the feet may act at one end, and the links $l$ be at the other end. I, however, have shown, in fig. 4, the treadles $m$ on the fulcrum $o$, formed by a prolongation of the perch or frame $f$, and connected, near their central portions, by the links $l$, to the cranks $k$.

In order to facilitate the steering of the vehicle, or the steadying of the wheels $b\ b$, I provide a steering-apparatus, consisting of the cross-bar $p$ and handles $q$, acting on the upper end of the inclined king-bolt $d$; or the handles may be formed of a bow or bar, jointed to the axle $c$, as seen at $q$, fig. 4.

In running over pavements or stone roadways, a jar is communicated to the person by the periphery of the wheels coming into contact with the rigid inequalities. To prevent this, I form the edge of the wheel as a groove, (see fig. 3,) into which an India-rubber rope or endless band, $s$, is laid, and retains its place by the contraction of the said band, or by nails or other fastenings passing through the rubber.

This mode of securing the rubber in a grooved periphery of the wheel, also prevents the velocipede slipping when at an inclination. It lessens the noise, gives more traction to the driving-wheel, relieves the rider from considerable concussion, and prevents injury to a floor, carpet, or other article ridden over.

It will be understood that, in consequence of the inclined position of the bolt $d$, the inclination of the vehicle and the turning of the steering-wheels are simultaneous.

I am aware that India rubber has been employed for the tires of wheel, and that the same has been introduced into a dovetailed groove in the periphery of a wheel.

What I claim, and desire to secure by Letters Patent, is—

1. A pair of wheels, mounted on an axle and bolt, substantially as specified, so that the swinging of the axle and the inclination of the vehicle are simultaneous, substantially as set forth.

2. The forwardly-inclined bolt $d$, axle $c$, and wheels $b\ b$, in combination with the wheel $a$, to which the propelling-power is applied, substantially as set forth, 3. The perch or frame $f$, connected with the inclined bearings for the bolt $d$, and extending to the axle of the wheel $a$, in combination with the axle $c$ and wheels $b\ b$, substantially as set forth.

4. A single driving-wheel, fitted with an axle that is eccentric, and to which the frame or perch is connected, in combination with cranks and levers, applied substantially as set forth, for communicating to said wheel a rotary motion, as specified.

5. The contractile ring, of round rubber, introduced into the rounded groove in the periphery of a wheel for velocipedes, as and for the purposes set forth.

In witness whereof, I have hereunto set my signature, this 18th day of February, A. D. 1869.

LEMUEL W. SERRELL.

Witnesses:
 CHAS. H. SMITH,
 GEO. T. PINCKNEY.